Aug. 12, 1952     A. W. DONOP     2,606,634
CONTROL FOR AUTOMATIC SLACK ADJUSTERS
Filed Nov. 8, 1949     3 Sheets-Sheet 1
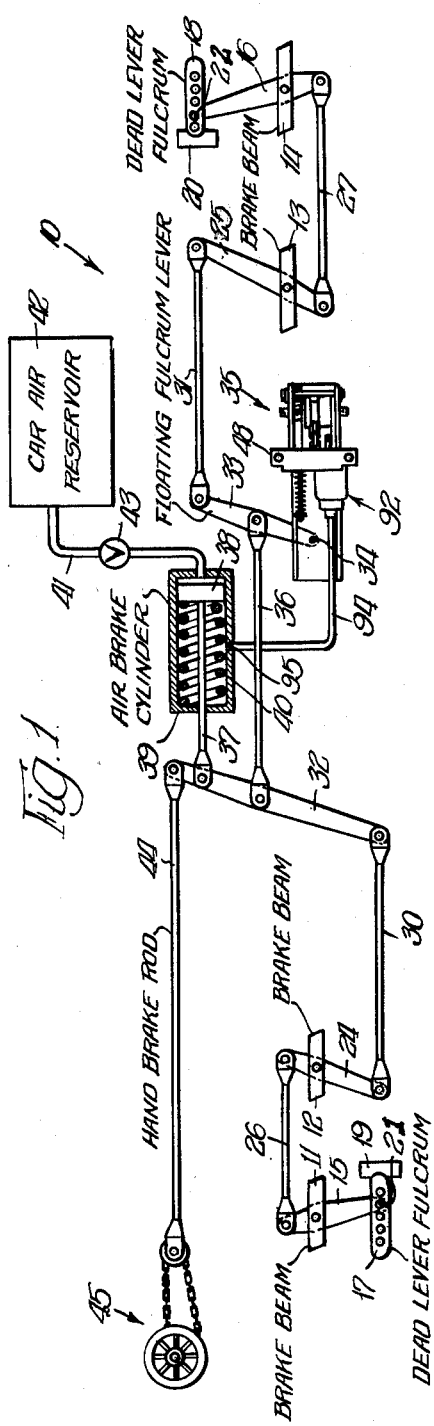
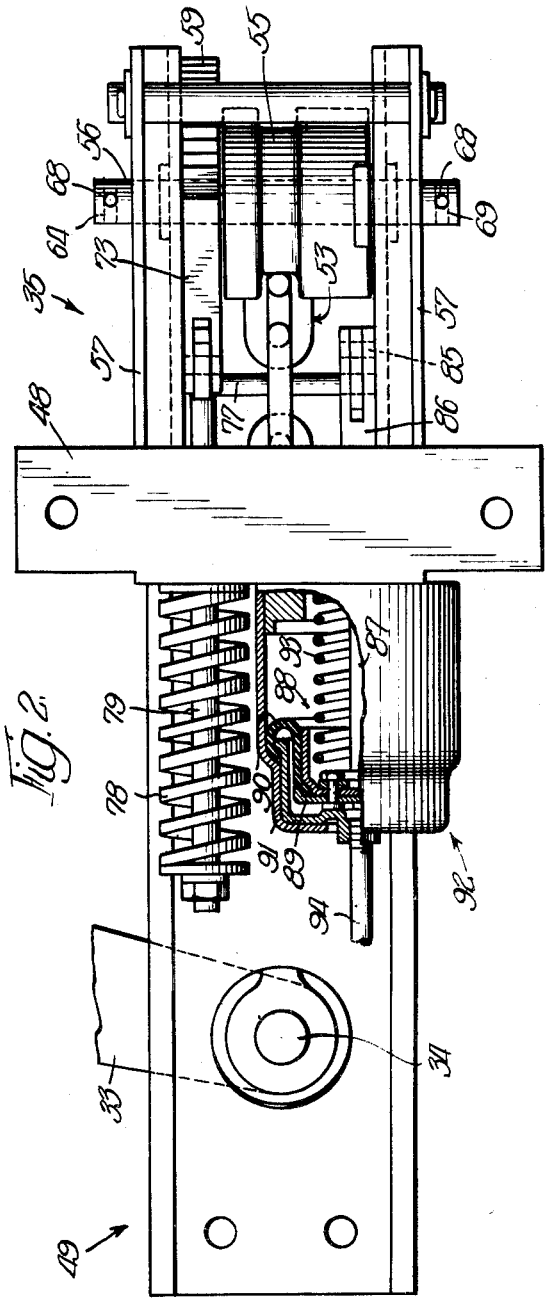
INVENTOR.
August W Donop,
BY Robert R. Lockwood
ATTY.

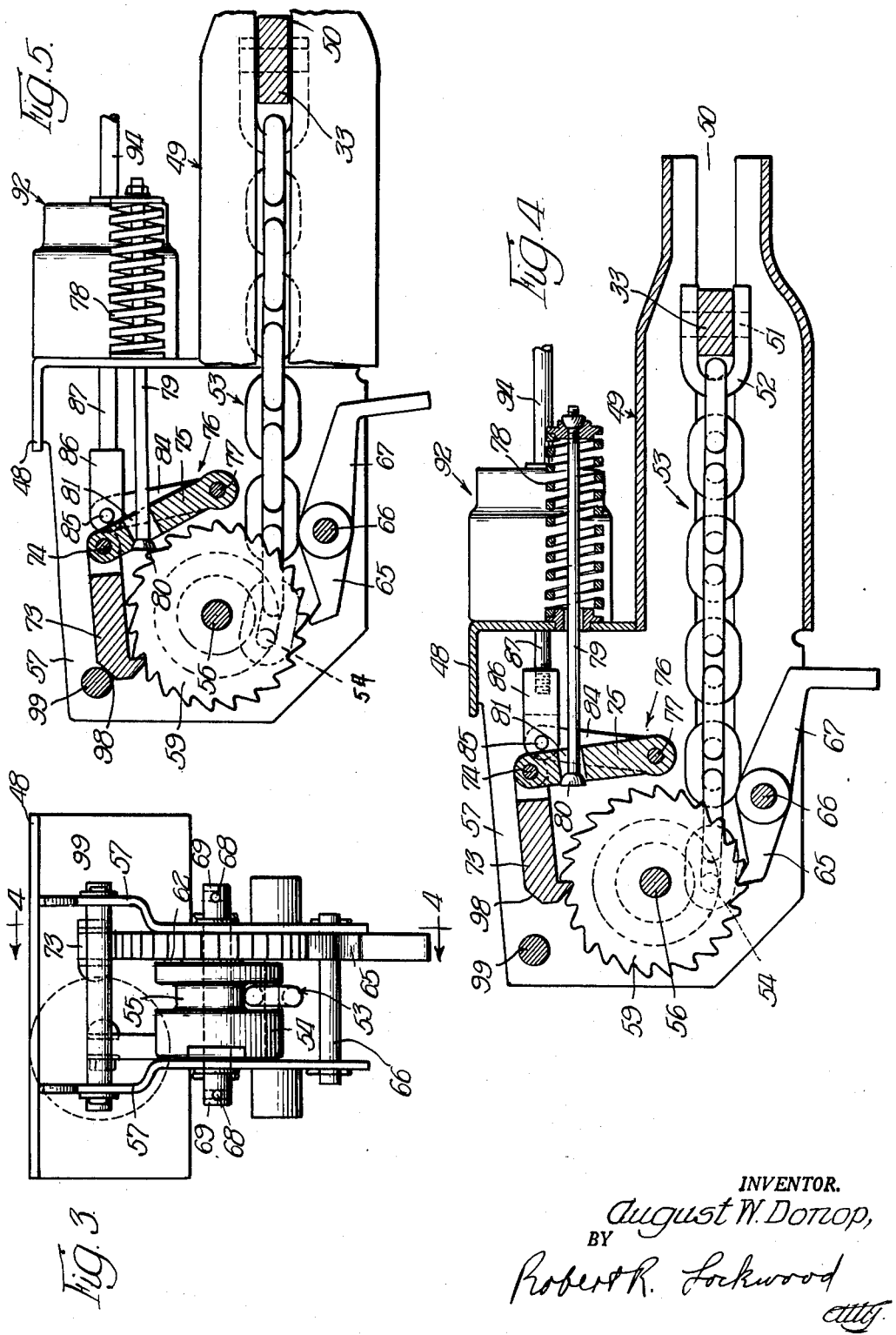

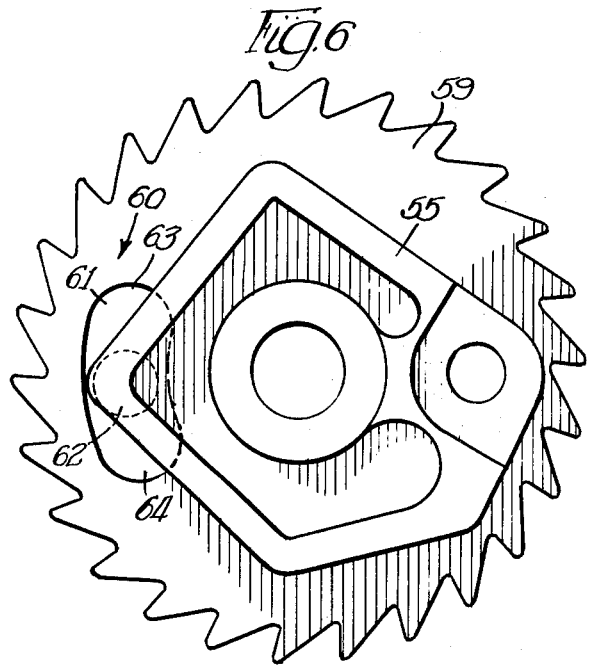
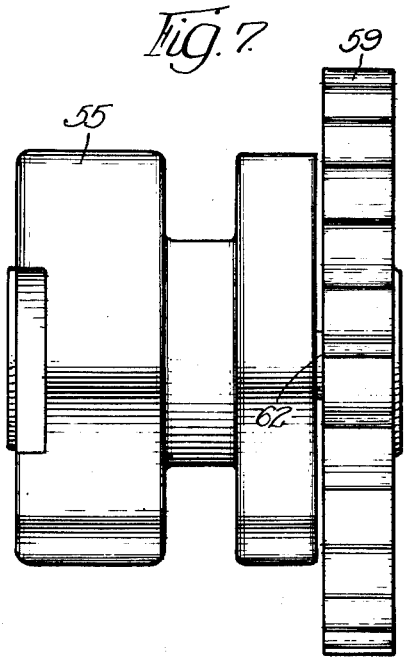
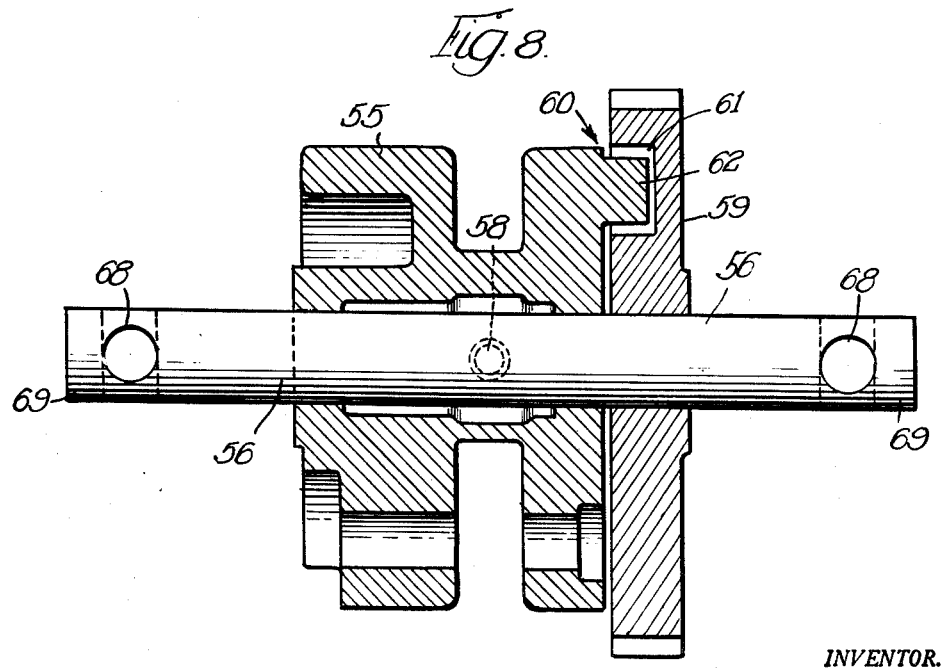

Patented Aug. 12, 1952

2,606,634

UNITED STATES PATENT OFFICE 2,606,634

CONTROL FOR AUTOMATIC SLACK ADJUSTERS

August W. Donop, Chicago, Ill., assignor to Ajax-Consolidated Company, Chicago, Ill., a corporation of Illinois Application November 8, 1949, Serial No. 126,174

1 Claim. (Cl. 188—198)

This invention relates, generally, to railway car brake rigging, and it has particular relation to mechanism for controlling automatic slack adjusters therefor. This invention is disclosed in conjunction with the automatic slack adjuster of copending application Serial No. 122,941, filed October 22, 1949, and assigned to the assignee of this application.

The automatic slack adjuster, above referred to, operates in conjunction with the air brake piston to take up a small amount of slack in the brake rigging when the piston travel exceeds a predetermined amount. If the slack, as originally present in the brake rigging after assembly on a car or after renewal of the brake shoes, is not within certain limits, it is likely that several applications of the brakes will be necessary before there is any braking effect on the car. One reason for this is that the automatic slack adjuster takes up only a small amount of slack each time that the brakes are applied and there is a travel of the air brake piston beyond a predetermined position. Under these conditions, the travel of the piston in the air brake cylinder will exceed predetermined minimums that have been established and may require that the car be cut out of a train until the slack is properly adjusted.

There is also the possibility that too much slack may be taken out of the brake rigging during the original installation or after the brake shoes have been renewed. This will result in a travel of the piston in the air brake cylinder which is too little to permit proper application of the brakes. The brakes will be applied too soon and with too great force so that the wheels of the car with the brake rigging having too little slack will tend to slide when the brakes are applied. Also there is a possibility that a part of the brake rigging may be broken because of the excessive forces which are involved.

Accordingly, among the objects of this invention are: To provide a predetermined amount of slack in a brake rigging of a railway car so that the slack present is always within predetermined limits, being not too great so as to prevent application of the brakes or too little with consequent excessive braking pressure; to provide for controlling an automatic slack adjuster for a railway car brake rigging so that there will always be a predetermined amount of slack in the brake rigging after the slack has been taken out through manual operation of the automatic slack adjuster in a direction to take up the same; to provide a lost motion connection in the automatic slack adjuster to perform this function; and to adjust the slack by winding an inextensible member, such as a chain connected at its free end to the fulcrum point of a floating fulcrum lever, on a drum either manually or automatically through a ratchet wheel operated in response to predetermined travel of the air brake piston, there being a lost motion connection between the drum and the ratchet wheel.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claim.

For a more complete understanding of the nature and scope of this invention, reference may be had to the following detailed description, taken together with the accompanying drawings, in which:

Figure 1 illustrates, schematically and diagrammatically, a brake rigging system that is used customarily on railway cars and having applied thereto the present invention;

Figure 2 is a top plan view of the automatic slack adjuster constructed in accordance with this invention;

Figure 3 is a view looking from the left end of the slack adjuster as shown in Figure 2;

Figure 4 is a detail sectional view, taken generally along the line 4—4 of Figure 3, and showing certain details of construction;

Figure 5 is a view, similar to Figure 4, but showing the manner in which the drum on which the chain is wound is prevented from rotating in a reverse direction in the event that the holding pawl should fail to hold and thus prevent its reverse rotation as it is intended normally to do;

Figure 6 is a view, in end elevation, of the chain winding drum and cooperating ratchet wheel which are interconnected by a lost motion connection;

Figure 7 is a view, in side elevation, of the chain winding drum and ratchet wheel shown in Figure 6; and Figure 8 is a longitudinal sectional view through the chain winding drum and ratchet wheel showing them mounted on a shaft.

Referring now particularly to Figure 1 of the drawings, it will be observed that the reference character 10 designates, generally, a conventional brake rigging which is used widely on railway cars. The brake rigging 10 includes brake beams 11, 12, 13, and 14 which carry brake shoes at their ends that are hung by links from the truck side frames. This construction is well known to those skilled in the art, and, accordingly, it is not further shown nor described herein. The brake beams 11 and 14 are pivoted on truck dead levers 15 and 16 that are pivoted to dead lever fulcrums or links 17 and 18. The fulcrums or links 17 and 18 are pivoted to arms 19 and 20 that are carried by the truck side frames. It will be observed that the truck dead levers 15 and 16 are pivoted at 21 and 22 to the fulcrums or links 17 and 18 and that these pivot points are adjustable therealong. The purpose of these adjustments is to provide for taking up slack manually in the brake rigging 10 as the brake shoes wear.

The brake beams 12 and 13 are carried by and pivoted on truck live levers 24 and 25 which are connected by bottom rods 26 and 27 to the truck dead levers 15 and 16, respectively. The truck live levers 24 and 25 are connected to top truck rods 30 and 31 through which the braking power is applied for moving the brake beams 11, 12, 13, and 14 and the brake shoes carried thereby toward the wheels for applying the brakes. The top truck rod 30 is pinned to a cylinder lever 32 while the top truck rod 31 is pinned to a floating fulcrum lever 33 whose fulcrum is indicated at 34 and the position of which may be adjusted by an automatic slack adjuster, shown generally at 35, in which the present invention is embodied. The floating fulcrum lever 33 is connected intermediate its ends by a cylinder rod 36 to the cylinder lever 32. The latter has a push rod 37 pivoted thereto. It will be noted that the push rod 37 has a piston 38 at the opposite end which is slidable in an air brake cylinder 39. Within the air brake cylinder 39 there is a coil compression spring 40 which acts to release the brakes when the air pressure is released from the air brake cylinder 39. Air pressure for moving the piston 38 to apply the brakes is supplied through a conduit 41 from a car air reservoir 42. The flow of air from the reservoir 42 to the cylinder 39 is controlled by a valve 43 in conventional manner.

The brakes also may be applied through a hand brake rod 44 by a hand brake mechanism that is indicated, generally, at 45. It will be noted that the hand brake rod 44 also is connected to the cylinder lever 32.

As indicated hereinbefore the present invention is directed particularly to the automatic slack adjuster 35 which is shown in more detail in Figures 2, 3 and 4 of the drawings. As there shown, the automatic slack adjuster 35 includes a support 48 which is arranged to be bolted or otherwise secured to the car body. The support 48 carries a frame, indicated generally at 49, having a slot 50, Figure 4, therein into which the fulcrum end of the floating fulcrum lever 33 projects.

The fulcrum end of the floating fulcrum lever 33 is secured by a pin 51 to a clevis 52 that is attached to one end of a flexible inextensible member such as a chain 53. The other end of the chain 53 is connected by a pin 54 to a drum 55 and is arranged to be wound thereon so as to shift the position of the fulcrum point 34 of the floating fulcrum lever 33 and take up the slack in the brake rigging 10.

The drum 55 is mounted for rotation with a shaft 56 which extends through side frame members 57 that form a part of the frame 49. The shaft 56 is rotatably mounted and provision is made for making the drum 55 fast thereon. For this purpose a set screw 58, Figure 8 may be employed.

Loosely mounted on the shaft 56 is a ratchet wheel 59. The ratchet wheel 59 is connected to the drum 55 by means of a lost motion connection that is indicated, generally, at 60. The lost motion connection 60 is made up, in accordance with this invention, of an arcuate slot 61 in the ratchet wheel 59 and a detent 62 projecting from the drum 55 axially into the arcuate slot 61. Driving engagement between the drum 55 and ratchet wheel 59 is had when the detent 62 is at one end 63 or the other 64 of the arcuate slot 61. The manner in which advantage as taken of the lost motion connection 60 between the drum 55 and the ratchet wheel 59 will be described in detail hereinafter.

In order to prevent reverse rotation of the ratchet wheel 59 and to prevent reverse rotation of the chain winding drum 55 when the brakes are applied, the detent 62 being at the end 63 of the arcuate slot 61, a holding pawl 65 is employed. The holding pawl 65 is rockably mounted on a shaft 66 which extends between the frame side members 57. The opposite end 67 of the pawl 65 acts as a counterweight to bias the pawl 65 into operative engagement with the teeth of the ratchet wheel 59. This end 67 can be grasped so as to swing the pawl 65 out of operative engagement with the ratchet wheel 59 when it is desired to unwind the chain 53 from the drum 55 as may be desired when the brake shoes are being replaced or the brake rigging is being readjusted for some reason.

Slack in the brake rigging 10 can be taken up manually by rotating the drum 55. For this purpose the shaft 56 has openings 68 in its ends 69 for receiving a bar or suitable tool (not shown). Alternatively, the end 69 of the shaft 56 can have flat sides to accommodate a wrench. It will be understood that the ends 69 of the shaft 56 constitute manually operable means, referred to in the claims, for rotating the drum 55 so as to wind the chain 53 thereon and shift the position of the fulcrum point 34 of the floating fulcrum lever 33 and, thereby, take up the slack in the brake rigging 10.

In order to take up the slack in the brake rigging 10 automatically when the travel of the piston 38 in the air brake cylinder 39 exceeds a predetermined amount, provision is made for rotating the ratchet wheel 59 forwardly a limited amount in order to accomplish this purpose. In order to do this an operating pawl 73 is arranged to cooperate with the ratchet wheel 59. As shown in Figure 4 the operating pawl 73 is pivoted at 74 on one arm 75 of a yoke that is indicated, generally, at 76. The yoke 76 is rockably mounted on a shaft 77 which extends between and is carried by the frame side members 57.

In order to rotate the ratchet wheel 59 forwardly by corresponding forward movement of the operating pawl 73, a coil compression spring 78 is employed. It will be noted in Figure 4 that one end of the spring 78 bears against a portion of the support 48 while its other end is arranged to act through a rod 79 having a ball shaped head 80 at its opposite end which interfits with a socket 81 in the arm 75. It will be understood that the spring 78 is compressed by means to be described and that, when the force applied to compress it is removed, it expands and moves the operating pawl 73 forwardly or to the right to effect a corresponding movement of the ratchet wheel 59.

The yoke 76 also includes an arm 84 which is movable conjointly with the arm 75. The arm 84 is pivoted at 85 to a clevis 86 which may be threaded on one end of a push rod 87.

As shown more clearly in Figure 2 of the drawings, the other end of the push rod 87 is arranged to be operated by a diaphragm type piston as indicated, generally, at 88. The diaphragm type piston 88 includes a head 89 which is connected directly to the left hand end of the push rod 87. A flexible diaphragm 90 interconnects the head 89 with a wall 91 of a slack adjusting air cylinder that is indicated, generally, at 92. A coil compression spring 93 is provided inside of the slack adjusting air cylinder 92 for returning the head 89 to the initial position shown in Figure 2. The spring 93 acts in the same direction as the coil compression spring 78 and, if desired, may be omitted.

Air for operating the diaphragm type piston 88 is supplied through a conduit 94 which is connected at 95, Figure 1, to the air brake cylinder 39. It will be observed that the conduit 94 is connected to the air brake cylinder 39 at such a position, for example, at a position where the piston 38 must move through a distance of seven inches, that the slack in the brake rigging 10 is taken up automatically only after the amount thereof exceeds a predetermined value. Thus, as long as the slack in the brake rigging 10 is not sufficient to permit the piston 38 to travel in applying the brakes sufficiently far to uncover the opening into the conduit 94, no air pressure is applied to the diaphragm type piston 88 and no automatic adjustment of the slack in the brake rigging 10 is made.

There is a remote possibility that the holding pawl 65 may not perform its intended function of preventing reverse rotation of the ratchet wheel 59 and drum 55. Such action might occur in the event that the ratchet wheel 59 were coated with ice and the drum 55 were advanced one notch in taking up the slack automatically in the brake rigging 10. In such case the ice in the next slot might prevent the holding pawl 65 from engaging with the next tooth on the ratchet wheel 59. It is important that the fulcrum point 34 of the floating fulcrum lever 33 be held stationary when the brakes are applied for otherwise, it is not possible to apply them. If the drum 55 should not be prevented from rotating in a reverse direction by the holding pawl 65, when the valve 43 is opened in attempt to apply the brakes, the drum 55 will be rotated in a reverse direction and will carry with it the operating pawl 73 and parts attached thereto. Since these parts are relatively light and weak, they cannot resist the reverse rotation of the drum 55 and, as a result, the brakes will not be applied since the fulcrum point 34 is not held stationary. Further, the automatic slack adjuster 35 may be severely damaged or possibly substantially destroyed.

With a view to preventing the reverse rotation of the drum 55 and the ratchet wheel 59 under such conditions where the holding pawl 65 does not perform its intended function, the operating pawl 73 is provided with an inclined end surface 98 that is arranged to engage a transverse stop pin 99 which extends between and is carried by the frame side members 57. Now, if the holding pawl 65 fails to prevent reverse rotation of the drum 55 and the ratchet wheel 59, the operating pawl 73, which is biased by its weight into engagement with the ratchet wheel 59, moves rearwardly as the drum 55 and ratchet wheel 59 are rotated in a reverse direction. However, such movement is limited by the engagement of the end surface 98 with the transverse stop pin 99. Not only does the pin 99 prevent further reverse rotation of the drum 55 and ratchet wheel 59 but also, because of the inclined end surface 98, the operating pawl 73 is moved into wedging engagement with the ratchet wheel 59, as indicated more clearly in Figure 5 of the drawings. Here the possible position of the holding pawl 65 is indicated which would permit the drum 55 and ratchet wheel 59 to rotate in a reverse direction in the event that the transverse stop pin 99 were not provided.

In describing the operation of the present invention it will be assumed that the slack in the brake rigging 10 initially is adjusted by locating the fulcrum points 21 and 22 along the dead lever fulcrums 17 and 18. As will appear hereinafter, additional adjustment of the slack in the brake rigging 10 can be made by the insertion of a bar in the opening 68 in one of the ends 69 of the shaft 56. Preferably the adjustment of the fulcrum points 21 and 22 is such that no part of the chain is wound on the drum 55. Also it will be assumed that the detent 62 of the lost motion connection 60 engages the end 63 of the arcuate slot 61. Under these assumed conditions it will further be assumed that the proper amount of slack is left in the brake rigging 10 for normal operation. As long as the piston 38 in the air brake cylinder 39 is not required to travel past the point 95 where the conduit 94 is connected to the air brake cylinder 39, no operation of the automatic slack adjuster takes place. However, when the slack in the brake rigging 10 is such that the piston 38 is required to move in the air brake cylinder 39 so as to uncover the conduit 94, on the next application of air to the air brake cylinder 39, air will be supplied through the conduit 94 to the slack adjusting air cylinder 92. The diaphragm type piston 88 will be moved to the right as viewed in Figure 2 and, through the push rod 87, the yoke 76 will be rocked a corresponding amount. The operating pawl 73 will be moved rearwardly to engage the next tooth of the ratchet wheel 59 and the coil compression spring 78 will be compressed correspondingly. During this interval the drum 55 is prevented from rotating in a reverse direction by the holding pawl 65 in engagement with the ratchet wheel 59 and the detent 62 bearing against the end 63 of the slot 61.

No further action takes place until the air pressure is released and the brake rigging 10 no longer applies the brakes. The release of air pressure from the slack adjusting air cylinder 92 permits the spring 78 and the spring 93 to move the operating pawl 73 forwardly and to effect a corresponding forward rotation of the drum 65. This is permitted since the brakes are not applied and the fulcrum point 34 of the floating fulcrum lever 33 is not held stationary. The chain 53 is wound on the drum 55 a slight amount. The forward rotation of the drum 55 is permitted by the holding pawl 65 which, since it is biased by the counterweight action of the opposite end 67, acts to engage the next tooth of the ratchet wheel 59 and prevents reverse rotation of the drum 55. In this manner the slack in the brake rigging 10 is automatically adjusted in small increments and is maintained at a predetermined value as will be understood readily.

There is the distinct possibility that the slack in the brake rigging 10 may not be taken out of it initially or when the brake shoes are renewed or adjustments made on the brake rigging 10 so as to obtain initially proper operation of the brakes. If sufficient slack is not taken out of the brake rigging 10 initially, then the piston 38 in the air brake cylinder 39 will move to the end of its stroke and air will be applied to the slack adjusting air cylinder 92. The drum 55 will be rotated forwardly through a small increment and a corresponding amount of the slack will be taken out of the brake rigging 10. The amount of slack taken out of the brake rigging 10 under these conditions purposely is small. However, under these particular assumed conditions, sufficient slack is not taken out of the brake rigging 10 so as to permit proper application of the brakes. Therefore, if a car with the brake rigging so adjusted is coupled onto a train and the brakes are applied, the brakes on this particular car will not be applied. Obviously it will require several applications of the brakes before the automatic slack adjuster 35 is able to take up sufficient slack in the brake rigging 10 so as to permit proper application of the brakes.

It is to avoid this difficulty that provision is made for rotating the chain winding drum 55 manually. Thus, after the truck dead levers 15 and 16 are positioned on the dead lever fulcrums 17 and 18, respectively, a bar or other suitable tool is inserted in one of the openings 68 in one of the ends 69 of the shaft 56. The chain winding drum 55 then is rotated forwardly to take up the remaining slack in the brake rigging 10.

Now it is essential that too much slack not be taken out of the brake rigging 10 for otherwise, sufficient travel of the piston 38 in the air brake cylinder 39 will not be permitted. This might result in the application of excessive stress to the brake rigging 10 and possible breakage of a portion of it such as one of the pins interconnecting the levers or the levers themselves. In order to avoid taking up too much slack in the brake rigging 10 the lost motion connection 60 is provided. When the chain winding drum 55 is rotated forwardly by the manually operable means, the ratchet wheel 59 remains stationary until the detent 62 engages the opposite end 64 of the arcuate slot 61. Thus, no matter how much effort is applied in rotating the chain winding drum 55 forwardly, there will always be a predetermined amount of slack left in the brake rigging 10 which corresponds to the length of the arcuate slot 63. On the next application of the brakes, the detent 62 will travel to the end 63 of the arcuate slot 61 before any braking effort is applied. The length of the arcuate slot 61 is determined by the amount of slack which should be left in the brake rigging 10 to permit proper movement of the piston 38.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

Means for adjusting automatically the slack in railway car brake rigging and controlling the same by adjusting the fulcrum point of the floating fulcrum lever or the like thereof operated by a piston in an air brake cylinder comprising, in combination, a rotatably mounted shaft, manually operable means for rotating said shaft, a drum fast on said shaft, a chain for connection at one end to the fulcrum point of said fulcrum lever and connected at its other end to said drum for winding thereon on forward rotation thereof to take up the slack in said brake rigging, a ratchet wheel loose on said shaft juxtaposed to one end of said drum and having an arcuate slot therein, a detent extending from said one end of said ratchet wheel into said slot whereby limited relative movement between said drum and ratchet wheel is permitted, a holding pawl biased into engagement with said ratchet wheel and acting to prevent reverse rotation thereof, a rockably mounted yoke, an operating pawl having an inclined end surface pivoted to one arm of said yoke and biased into engagement with said ratchet wheel, a transverse pin in the path of said end surface of said operating pawl and adapted to be engaged thereby on failure of said holding pawl to prevent reverse rotation of said ratchet wheel for wedging said operating pawl into engagement therewith and preventing further reverse rotation thereof, a coil compression spring connected to said arm and acting to move said operating pawl so as to rotate said ratchet wheel and drum forwardly, a slack adjusting air cylinder having a piston therein connected to the other arm of said yoke, and a conduit from said slack adjusting air cylinder for connection to said air brake cylinder at a location where operating pressure is applied to said slack adjusting air cylinder after the piston in said air brake cylinder has moved to a predetermined position in applying the brakes whereupon said piston in said slack adjusting air cylinder rocks said yoke, compresses said spring and moves said operating pawl rearwardly to engage the next tooth of said ratchet wheel, the release of air pressure from said air brake cylinder and from said slack adjusting air cylinder permitting said coil compression spring to rotate said ratchet wheel and drum forwardly, the aforesaid limited relative movement between said drum and said ratchet wheel provided by said detent and said arcuate slot permitting said drum to be rotated forwardly by said manually operable means to take up the slack in said brake rigging without causing corresponding forward rotation of said ratchet wheel until said detent reaches one end of said arcuate slot, reverse rotation of said drum being permitted on application of air to said air brake cylinder and consequent movement of said brake rigging until said detent engages the opposite end of said arcuate slot whereby a predetermined amount of slack is left in said brake rigging after the slack therein is taken up by said manually operable means.

AUGUST W. DONOP.

REFERENCES CITED

The following references are of record in the file of this patent:

UNITED STATES PATENTS

| Number | Name | Date |
| --- | --- | --- |
| 1,407,628 | Berry et al. | Feb. 21, 1922 |
| 1,964,333 | Sauvage | June 26, 1934 |
| 2,097,533 | Redford | Nov. 2, 1937 |
| 2,433,139 | Martin | Dec. 23, 1947 |